US012190772B1

(12) United States Patent
Lim et al.

(10) Patent No.: US 12,190,772 B1
(45) Date of Patent: Jan. 7, 2025

(54) GATE DRIVING CIRCUITS AND DISPLAY PANELS

(71) Applicant: SHENZHEN CHINA STAR OPTOELECTRONICS SEMICONDUCTOR DISPLAY TECHNOLOGY CO., LTD., Guangdong (CN)

(72) Inventors: Donghun Lim, Guangdong (CN); Yunpeng Lin, Guangdong (CN); Yingchun Zhao, Guangdong (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/523,120

(22) Filed: Nov. 29, 2023

(30) Foreign Application Priority Data

Sep. 21, 2023 (CN) ........................ 202311232159.1

(51) Int. Cl.
*G09G 3/20* (2006.01)

(52) U.S. Cl.
CPC ....... *G09G 3/20* (2013.01); *G09G 2310/0267* (2013.01); *G09G 2310/0286* (2013.01); *G09G 2320/04* (2013.01)

(58) Field of Classification Search
CPC ........................... G09G 3/3266; G09G 3/3677
See application file for complete search history.

(56) References Cited

U.S. PATENT DOCUMENTS

| | | | | |
|---|---|---|---|---|
| 10,127,878 | B1 * | 11/2018 | Lv | G11C 19/184 |
| 10,930,238 | B1 * | 2/2021 | Li | G09G 3/3677 |
| 2018/0182339 | A1 * | 6/2018 | Zeng | G09G 3/3677 |
| 2018/0211627 | A1 * | 7/2018 | Shi | G11C 19/28 |
| 2020/0035137 | A1 * | 1/2020 | Chen | G11C 19/28 |

* cited by examiner

*Primary Examiner* — Sepehr Azari
(74) *Attorney, Agent, or Firm* — PV IP PC; Wei Te Chung

(57) ABSTRACT

A gate driving circuit including cascaded gate driving units is provided. A gate driving unit includes a pull-up control module, a pull-up module electrically connected to the pull-up control module through a first node, a pull-down maintaining module electrically connected to the first node and a voltage line, and a voltage control module. An input terminal of the pull-up module loads a clock signal, and an output terminal is electrically connected to a gate line. The pull-down maintaining module is electrically connected to the pull-up module through the first node and includes an inverter module. The voltage control module is electrically connected to an output terminal of the inverter module to control a first transition edge of a signal at the output terminal of the inverter module to lag behind a second transition edge of the clock signal within a duration of a corresponding clock pulse of the clock signal.

18 Claims, 2 Drawing Sheets

GATE DRIVING CIRCUITS AND DISPLAY PANELS

CROSS-REFERENCE TO RELATED APPLICATION

This application claims priority to and the benefit of Chinese Patent Application No. 202311232159.1, filed on Sep. 21, 2023, the disclosure of which is incorporated herein by reference in its entirety.

TECHNICAL FIELD

The present disclosure relates to display technologies, and in particular, to gate driving circuits and display panels.

BACKGROUND

Gate Driver On Array (GOA) technique is conducive to the design of narrow borders of display screens, and thus is widely used.

Aging tests or process factors may increase a leakage current of a transistor in a pull-down maintaining unit of a GOA, which is used to control a pull-up unit, causing current leakage at a connection point between the pull-down maintaining unit and the pull-up unit, further causing a gate level of the transistor to be pulled up in advance. This enlarges a turn-on degree of the transistor, which results in a leakage path between an input terminal in the pull-up unit for loading a clock signal and a terminal in the pull-down maintaining unit electrically connected to a low-voltage signal line, increasing a risk of GOA being burned out.

Due to the above-mentioned problems, the GOA circuit needs to be improved.

SUMMARY

According to some embodiments, the present disclosure provides a gate driving circuit. The gate driving circuit includes a plurality of cascaded gate driving units. Each gate driving unit of at least one gate driving unit of the gate driving units includes:

a pull-up control module configured to pull up a level of a first node of the each gate driving units in response to a stage-transmission signal;

a pull-up module, wherein a control terminal of the pull-up module is electrically connected to the pull-up control module through the first node, an input terminal of the pull-up module is electrically connected to a clock signal line to load a clock signal, an output terminal of the pull-up module is electrically connected to a gate line, and the pull-up module is configured to respond to the level of the first node to transmit the clock signal to the gate line;

a pull-down maintaining module, wherein the pull-down maintaining module is electrically connected between the first node and a voltage line and is electrically connected to the control terminal of the pull-up module through the first node, the pull-down maintaining module comprises an inverter module and a switch element, a control terminal of the inverter module is electrically connected to the first node, and an output terminal of the inverter module is electrically connected to a control terminal of the switch element, and the switch element is configured to control connection between the gate line and the voltage line; and a voltage control module, wherein the voltage control module is electrically connected to the output terminal of the inverter module, the voltage control module is configured to control a first transition edge of a signal at the output terminal of the inverter module to lag behind a second transition edge of the clock signal within a duration of a corresponding clock pulse of the clock signal, the first transition edge is arranged adjacent to the second transition edge on a time axis, and the second transition edge corresponds to an end of the clock pulse.

According to some embodiments, the present disclosure provides a display panel. The display panel includes a gate driving circuit. The gate driving circuit includes a plurality of cascaded gate driving units. Each gate driving unit of at least one gate driving unit of the gate driving units includes:

a pull-up control module configured to pull up a level of a first node of the each gate driving unit in response to a stage-transmission signal;

a pull-up module, wherein a control terminal of the pull-up module is electrically connected to the pull-up control module through the first node, an input terminal of the pull-up module is electrically connected to a clock signal line to load a clock signal, an output terminal of the pull-up module is electrically connected to a gate line, and the pull-up module is configured to respond to the level of the first node to transmit the clock signal to the gate line;

a pull-down maintaining module, wherein the pull-down maintaining module is electrically connected between the first node and a voltage line and is electrically connected to the control terminal of the pull-up module through the first node, the pull-down maintaining module comprises an inverter module and a switch element, a control terminal of the inverter module is electrically connected to the first node, and an output terminal of the inverter module is electrically connected to a control terminal of the switch element, and the switch element is configured to control connection between the gate line and the voltage line; and a voltage control module, wherein the voltage control module is electrically connected to the output terminal of the inverter module, the voltage control module is configured to control a first transition edge of a signal at the output terminal of the inverter module to lag behind a second transition edge of the clock signal within a duration of a corresponding clock pulse of the clock signal, the first transition edge is arranged adjacent to the second transition edge on a time axis, and the second transition edge corresponds to an end of the clock pulse.

BRIEF DESCRIPTION OF THE DRAWINGS

The present disclosure will be further described below with reference to accompanying drawings. It should be noted that the drawings in the following description are only used to illustrate some embodiments of the present disclosure. Those skilled in the art may obtain other drawings based on these drawings without exerting creative efforts.

DETAILED DESCRIPTION

Technical solutions in embodiments of the present disclosure will be clearly and completely described below in connection with the accompanying drawings in the embodiments of the present disclosure. It is apparent that the described embodiments are only part of the embodiments of the present disclosure and not all of them. Based on the embodiments of the present disclosure, all other embodiments obtained by a person skilled in the art without involving any inventive effort are within the scope of the present disclosure.

The terms "first", "second", "third", etc., in the present disclosure are used to distinguish different objects, rather than describing a specific sequence. Furthermore, the terms "include" and "have" and any variations thereof are intended to cover non-exclusive inclusion. For example, a process, method, system, product, or device that includes a series of operations or modules are not limited to listed operations or modules, but optionally also include operations or modules that are not listed, or optionally also include other operations or modules inherent to such processes, methods, products, or devices.

Reference herein to "embodiment" means that a particular feature, structure, or characteristic described in connection with the embodiment can be included in at least one embodiment of the present disclosure. This phrase in various places in the present disclosure are not necessarily all referring to the same embodiment, nor are separate or alternative embodiments mutually exclusive. Those skilled in the art understand, both explicitly and implicitly, that the embodiments described herein may be combined with other embodiments.

Some embodiments of the present disclosure provide gate driving circuits, which include but are not limited to the following embodiments and combinations thereof.

Figure 1:
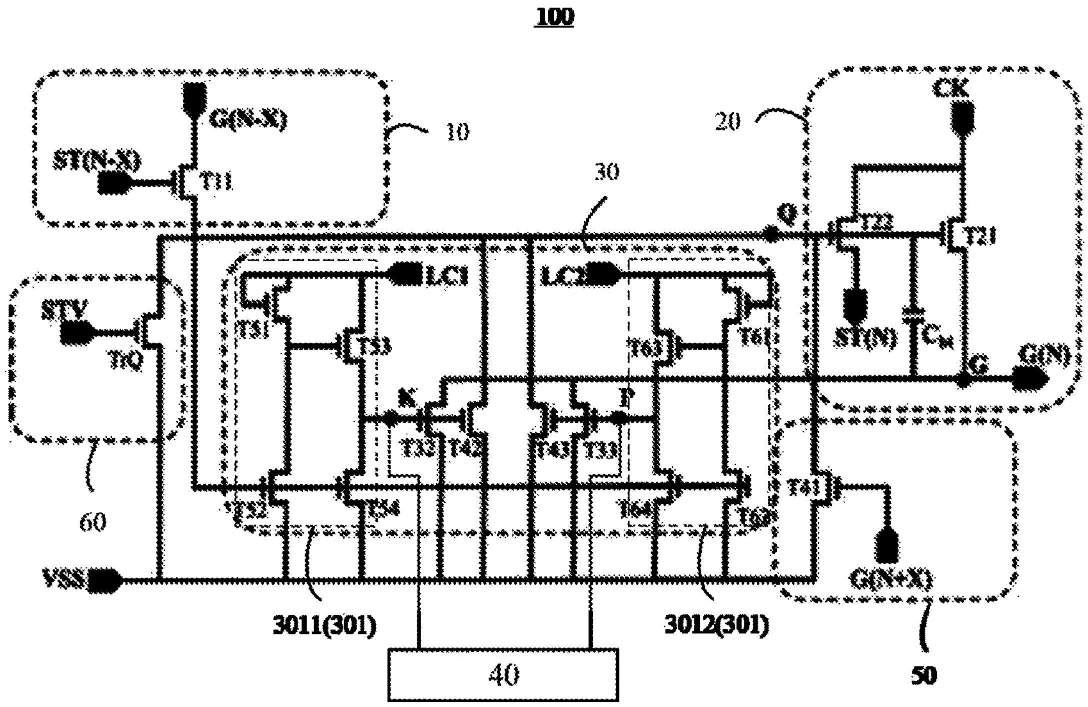
FIG. 1 is a circuit diagram of a gate driving unit according to some embodiments of the present disclosure.

In some embodiments, the gate driving circuit includes a plurality of cascaded gate driving units. FIG. 1 is a circuit diagram of an exemplary gate driving unit 100 according to some embodiments of the present disclosure. As shown in FIG. 1, the gate driving unit 100 includes: a pull-up control module 10, a pull-up module 20, a pull-down maintaining module 30, and a voltage control module 40. The pull-up control module 10 is configured to pull up a level of a first node Q of the gate driving unit in response to a stage-transmission signal ST(N-X). A control terminal of the pull-up module 20 is electrically connected to the pull-up control module 10 through the first node Q, an input terminal of the pull-up module 20 is electrically connected to a clock signal line to load a clock signal CK, an output terminal G of the pull-up module 20 is electrically connected to a gate line to output a gate signal of current stage (e.g., G(N), when the current gate driving unit 100 is an Nth-stage gate driving unit, N being a positive integer). The pull-up module 20 is configured to respond to the level of the first node Q to transmit the clock signal CK to the gate line. The pull-down maintaining module 30 is electrically connected between the first node Q and a voltage line and is electrically connected to the control terminal of the pull-up module 20 through the first node Q. The pull-down maintaining module 20 includes an inverter module 301 and a switch element (including at least one of a first pull-down transistor T32 or a second pull-down transistor T33). A control terminal of the inverter module 301 is electrically connected to the first node Q, and an output terminal (referred to as KP and electrically connected to at least one of a second node K and a third node P, voltages of the two nodes may be the same) of the inverter module 301 is electrically connected to a control terminal (a gate of at least one of the first pull-down transistor T32 and the second pull-down transistor T33) of the switch element. The switch element is configured to control connection between the gate line and the voltage line (for loading a voltage signal VSS). The voltage control module 40 is electrically connected to the output terminal KP of the inverter module 301. The voltage control module 40 is configured to control a first transition edge of a signal at the output terminal KP of the inverter module 301 to lag behind a second transition edge of the clock signal CK within a duration (included in a duration when a level of the first node Q is a theoretically active level) of a corresponding clock pulse p12 of the clock signal CK. The first transition edge is arranged adjacent to the second transition edge on a time axis. The second transition edge corresponds to an end of the clock pulse p12.

As shown in FIG. 1, the pull-up control module 10 may control a working state of the pull-up module 20 by controlling the level of the first node Q. Under a control of the clock signal CK, the pull-up module 20 may generate and output the corresponding gate signal G(N). Further, the gate driving unit 100 may further include a pull-down module 50 that is also electrically connected to the first node Q. Both the pull-down module 50 and the inverter module 301 of the pull-down maintaining module 30 may control the level of the first node Q to influence the pull-up module 20 to generate and output the corresponding the gate signal G(N). In addition, other components in the pull-down maintaining module 30 may also be electrically connected to the gate line to affect the corresponding gate signal G(N).

Figure 2:
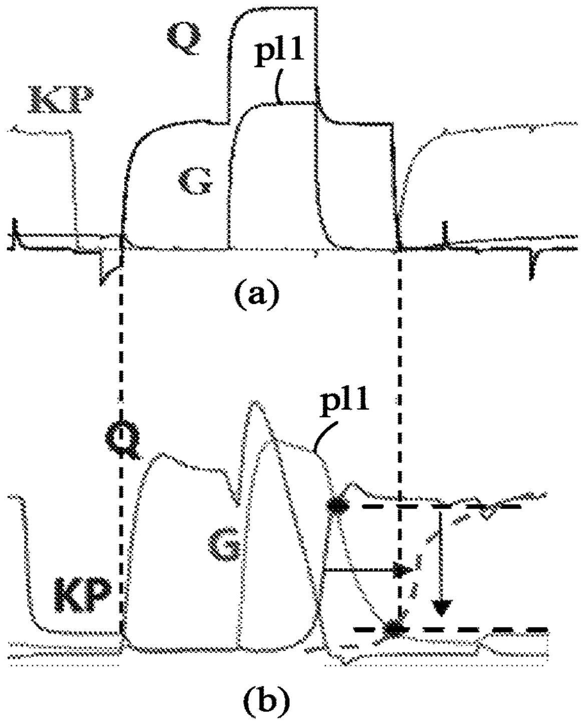
FIG. 2 to FIG. 4 are waveform diagrams of some signals in the gate driving unit according to some embodiments of the present disclosure.
Figure 3:
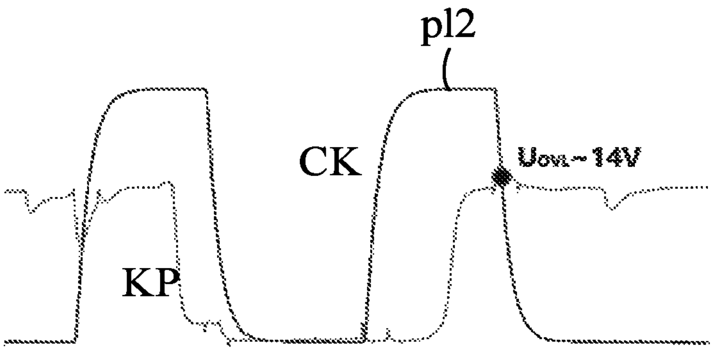

The present disclosure does not limit types of transistors in the gate driving unit 100, magnitude relationships and specific numerical values of the above-mentioned voltage signals, gate active pulses, clock pulses, and the following first voltage. For the convenience of description, the present disclosure only describes with examples where a gate driving unit 100, in which each transistor is an N-type transistor, and voltage values corresponding to the gate active pulses and the clock pulses are greater than voltage values corresponding to the voltage signal and the first voltage. That is, the first transition edge may be a rising edge of a signal at the output terminal KP (at least one of the second node K or the third node P) of the inverter module 301, and the second transition edge may be a falling edge of the clock signal CK. As shown in FIG. 2, FIG. 2(*a*) includes waveforms of the signal at the output terminal KP of the inverter module 301 and a signal at the output terminal G of the gate driving unit 100 when a waveform of a signal at the first node Q is normal, FIG. 2(*b*) includes waveforms of the signal at the output terminal KP of the inverter module 301 and the signal at the output terminal G of the gate driving unit 100 when the waveform of the signal at the first node Q is abnormal, and FIG. 3 shows a waveform of the clock signal CK and a waveform of the signal at the output terminal KP of the inverter module 301 corresponding to FIG. 2(*b*).

As shown in FIG. 2(*a*), during a duration (including a duration of the clock signal CK when it is in a duration of the clock pulse p12) when the level of the first node Q is an active level, a normal waveform of the signal of the first node Q means that the active (high) level of the first node Q may control the pull-up module 20 to work normally, so that the gate signal G(N) transmitted by the gate line may include a gate active pulse p11 (which may be provided by the clock pulse p12 (not shown in the figure), that is, the clock signal CK includes a clock pulse at this time). In such case, the level of the first node may be maintained at the active level to ensure an output of the gate active pulse p11, until the first transition edge (rising edge) of the signal at the output terminal KP of the inverter module 301 appears, and then the level of the first node Q and the level of the output terminal G of the gate driving unit 100 are pulled down.

However, aging tests, process factors, etc., may increase a leakage current of a transistor (including e.g., at least one of a first pull-down maintaining transistor T42 or a pull-down maintaining transistor T43) for controlling the first node Q in the pull-down maintaining unit of the gate driving unit 100. As shown in FIG. 2(*b*), the level (i.e., a level at the control terminal of the inverter module 301) of the first node Q is reduced in advance (an abnormal situation) due to the current leakage, which causes the level at the output terminal KP of the inverter module 301 to increase in advance and enlarge a turn-on degree of the switch element, resulting in a leakage path between the input terminal for loading the clock signal CK in the pull-up module 20 and a terminal for loading the voltage signal VSS in the pull-down maintaining module 30. As shown in FIG. 3, the second transition edge (falling edge) of the clock signal CK has not yet ended, that is, the clock signal CK is still at a high voltage (i.e., a voltage Uov1 at an intersection point of the waveform of the signal at the output terminal KP of the inverter module 301 and the waveform of the clock signal CK, at this time, Uov1 may equal to or be much larger than a voltage value of the voltage signal VSS, e.g., 14 volts (V)), a difference between the voltage value of the voltage signal VSS and a voltage value of the clock pulse of the clock signal CK may be relatively large, and thus a risk of the gate driving unit 100 being burned out is relatively large.

Figure 4:
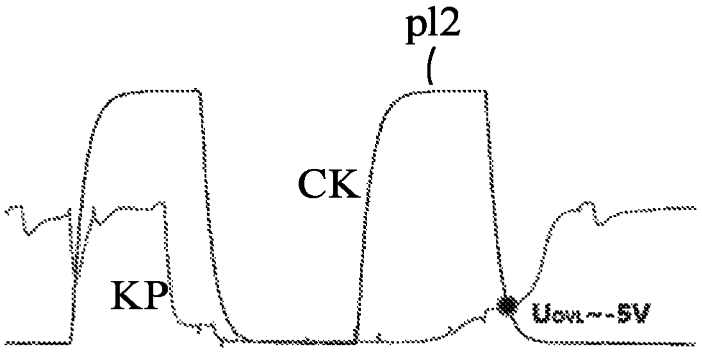

In view of the above problems, in some embodiments, the voltage control module 40 is electrically connected to the output terminal KP of the inverter 301. In this way, the voltage control module 40 may control the voltage of the output terminal KP (that is, the control terminal of the switch element, which may be a gate of at least one of the first pull-down transistor T32 or the second pull-down transistor T33) of the inverter module 301, so as to further control an electrical connection between the gate line and the voltage line. In some embodiments, as shown in FIG. 4, the voltage control module 40 is configured to, when the clock signal CK is in the duration corresponding to the clock pulse p12 (during which the difference between the voltage value of the voltage signal VSS and the voltage value of the clock pulse of the clock signal CK is relatively large), control the first transition edge (rising edge) of the signal at the output terminal KP of the inverter module 301 to lag behind the second transition edge (falling edge) of the clock signal CK. The first transition edge is arranged adjacent to the second transition edge on the time axis. That is, the voltage control module 40 controls the signal at the output terminal KP of the inverter module 301 to generate the first transition edge (rising edge) after the clock pulse p12 of the clock signal CK ends (that is, the gate active pulse p11 of the gate signal G(N) ends). At this time, Uov1 may equal to or close to the voltage value of the voltage signal VSS. For example, Uov1 may be −5 V. In this way, the switch element may be turned on, and vice versa. In other words, when the clock signal CK is within a duration corresponding to the clock pulse p12, the voltage control module 40 may control the output terminal KP of the inverter module 301 to maintain at a voltage before the first transition edge (rising edge), so that the switch element is turned off. In this way, a leakage path between the gate line and the voltage line is avoided, reducing the risk of the gate driving unit 100 being burned out.

It is worth mentioning that after the second transition edge (falling edge) of the clock signal CK, that is, after the clock pulse of the clock signal CK ends, the difference between the voltage value of the voltage signal VSS and the voltage value of the clock pulse of the clock signal CK is small. Even if the signal at the output terminal KP of the inverter module 301 generates the first transition edge (rising edge) (that is, the switch element is turned on), a current generated in the leakage path formed is small, and thus the risk of the gate driving unit 100 being burned out is low. At this time, the voltage control module 40 no longer controls the switch element to turn off, which allows the switch element to be subsequently operated only by the inverter module 301 to control the level of the first node Q.

In some embodiments, as shown in FIG. 1, the switch element includes: the first pull-down transistor T32, where a gate of the first pull-down transistor T32 is electrically connected to the output terminal KP of the inverter module 301, a source of the first pull-down transistor T32 is electrically connected to the voltage line to load the voltage signal VSS, and a drain of the first pull-down transistor T32 is electrically connected to the gate line (i.e., the output terminal G of the gate driving unit 100). As discussed above, the voltage control module 40 in the present disclosure can control the electrical connection between the gate line and the voltage line by controlling the level of the gate of the first pull-down transistor T32, thereby controlling the electrical connection between the terminal for loading the clock signal CK and the voltage line, so as avoid the leakage path during the duration of the corresponding clock pulse p12 of the clock signal CK.

In some embodiments, as shown in FIGS. 1 to 5, the voltage control module 40 includes: a first voltage control terminal electrically connected to a first control line to load a first control signal Con1; a voltage input terminal electrically connected to a first voltage line to load a first voltage V1; and a voltage output terminal electrically connected to the output terminal KP (at least one of the second node K or the third node P) of the inverter module 301. The first control signal Con1 is used to control transmission of the first voltage V1 to the voltage output terminal KP before the clock signal CK reaches the second transition edge.

It should be understood that in some embodiments, the first control signal Con1 is set to control the transmission of the first voltage V1 to the voltage output terminal KP (at least one of the second node K or the third node K) before the clock signal CK reaches the second transition edge. That is, the first voltage V1 may be used to control the switch element (at least one of the first pull-down transistor T32 and the second pull-down transistor T33) to turn off to disconnect the leakage path between the gate line and the voltage line, thereby reducing the risk of the gate driving unit 100 being burned out.

In some embodiments, as shown in FIGS. 1 to 5, the first control line is the corresponding clock signal line. That is, the first control signal Con1 is the clock signal CK. In particular, since the voltage control module 40 is configured to control the first transition edge of the signal at the output terminal KP of the inverter module 301 to lag behind the second transition edge of the clock signal CK, it is possible to use the clock signal CK, which includes the second transition edge (as a comparison reference of a time point of the first transition edge), to control a time point when the first voltage V1 is transmitted to the voltage output terminal (at least one of the second node K or the third node P) of the voltage control module 40. Further, together with setting of the first voltage V1, the clock signal CK may accurately control the time point when the first voltage V1 is transmitted to the voltage output terminal KP, so as to improve reliability of setting of the first transition edge.

In some embodiments, as shown in FIGS. 1 to 5, the voltage line is electrically connected to the first voltage line, that is, the first voltage V1 equals to the voltage signal VSS. In conjunction with the above descriptions, the clock signal CK is used to control the time point when the first voltage V1 (the voltage signal VSS) is transmitted to the voltage output terminal KP of the voltage control module 40. As shown in FIGS. 2 to 5, before the second transition (falling edge) ends, the voltage output terminal KP of the voltage control module 40 is configured to load a voltage signal VSS much less than the voltage value of the clock pulse p12 to control the switch element to turn off, thereby avoiding the abovementioned leakage path, reducing the risk of the gate driving unit 100 being burned out. In addition, the voltage line may also be multi-use to reduce a complexity of the gate driving unit 100.

In some embodiments, as shown in FIGS. 1 to 5, the voltage control module 40 further includes a second voltage control terminal electrically connected to a second control line to load a second control signal Con2. The second control signal Con2 is used to control transmission of the first voltage V1 to the voltage output terminal through the first control signal Con1 before the clock signal CK reaches the second transition edge. Correspondingly, the second control signal Con2 is used to control the inverter module 301 to control the level of the first node Q (maintaining at an inactive level) after the clock signal CK reaches the second transition edge.

As discussed above, the above leakage problem is caused by a reduction of the level of the first node Q during the duration of the theoretically active level (that is, before the clock signal CK reaches the second transition edge). Therefore, in some embodiments, by setting the second voltage control terminal, the level at the output terminal KP of the inverter module 301 may further be controlled by the voltage control module 40 only during the duration of the active level (where the level of the first node Q is reduced), so as to avoid the first voltage V1 to be transmitted to the voltage output terminal after the duration of the active level ends. In this way, the switch element may only be controlled by the inverter module 301, thereby realizing controlling the level of the first node Q. For example, the pull-down module 50 may pull down the level of the first node Q to an inactive level, and then the inverter module 301 is used to control other components (e.g., at least one of the first pull-down maintaining transistor T42 or the second pull-down maintaining transistor T43) in the pull-down maintaining module 30 to maintain the level of the first node Q at the inactive level.

In some embodiments, as shown in FIGS. 1 to 5, the voltage control module 40 includes: a first voltage control transistor T55, where a gate of the first voltage control transistor T55 is configured as the second voltage control terminal, and a source of the first voltage control transistor T55 is configured as the first voltage control terminal; and a second voltage control transistor T50, where a gate of the second voltage control transistor T50 is electrically connected to a drain of the first voltage control transistor T55, a source of the second voltage control transistor T50 is configured as the voltage input terminal, and a drain of the second voltage control transistor T50 is configured as the voltage output terminal.

Based on the above descriptions, it can be seen that when the second control signal Con2 controls the first voltage control transistor T55 to turn on, the first control signal Con1 may be transmitted to the gate of the second voltage control transistor T50 through the first voltage control transistor T55, to control the transmission of the first voltage V1 to the voltage output terminal KP of the voltage control module 40 through the second voltage control transistor T50.

Figure 5:
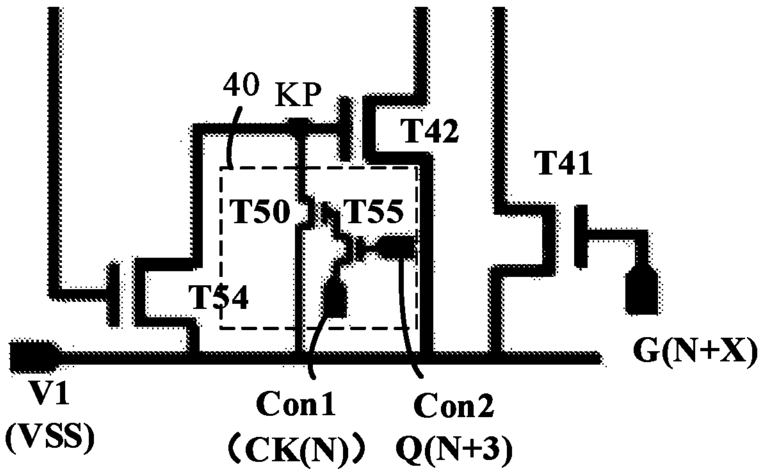
FIG. 5 is a circuit diagram of a part related to a voltage control module in the gate driving unit according to some embodiments of the present disclosure.

In some embodiments, as shown in FIGS. 1 to 5, the second control line is electrically connected to a first node Q of another one of the gate driving units subsequently cascaded to the gate driving unit 100 of the current stage, that is, the second control signal Con2 may be a signal of the first node Q of the another one gate driving unit at a certain stage (for brevity, referred to as a subsequent stage hereinafter) after the current stage. In conjunction with the above descriptions, the second control signal Con2 should satisfy that: an active pulse corresponding to Con2 appears before an end time point of a clock pulse p12 of a clock signal CK at the subsequent stage. Referring to FIGS. 2-4, the active control pulse corresponding to the second control signal Con2 overlaps with the clock pulse p12 of the clock signal CK at the subsequent stage, rather than appears after the clock pulse p12 of the clock signal CK. In this way, the leakage phenomenon is reduced. In addition, the second control signal Con2 should further satisfy that: the active pulse corresponding to Con2 ends before a theoretical inactive (low) level of the first node Q at the subsequent stage. In some embodiments, the duration of the active level of the first node Q of the gate driving unit 100 at the current stage ends before the end of the clock pulse p12, and the level of the first node Q at the subsequent stage may be pulled down before the end of the clock pulse p12 due to abnormality. However, when the first node Q at the current stage is abnormal, the first node Q at the subsequent stage may still wok normally. Thus, in some embodiments, taking the signal of the first node Q of the gate driving unit 100 at the subsequent stage as the second control signal Con2 may avoids the risk. In addition, to avoid the clock signal CK from affecting the level at the output terminal KP of the inverter module 301, the active control pulse of the second control signal Con2 should end before the time point (which is determined by the pull-down module 50) when the level of the first node Q at the current stage is pulled down. To this end, a stage number of the subsequent stage may be determined accordingly, for example, the stage number of the subsequent stage in FIG. 5 is (N+3). That is, the first node Q at the subsequent stage, which is electrically connected to the second control line at the current stage, may be represented as Q(N+3).

In some embodiments, as shown in FIG. 1, the gate driving unit 100 may further include a reset module 60. The reset module 60 may include a reset transistor TrQ. Agate of the reset transistor TrQ may load a reset signal STV, a source of the reset transistor TrQ may be electrically connected to the voltage line to load the voltage signal VSS, and a drain of the reset transistor TrQ may be electrically connected to the first node Q. In this way, before the gate driving unit 100 operates, the reset transistor TrQ is turned on through the reset signal STV to pull down the level of the first node Q through the voltage signal VSS, thereby realizing a reset of the first node Q.

The pull-up control module 10 may include a pull-up control transistor T11. A gate of the pull-up control transistor T11 loads a (NX)th stage-transmission signal ST(N-X), X being a positive integer. A source of the pull-up control transistor T11 loads a (N-X)th stage gate signal G(N-X). A drain of the pull-up control transistor T11 is electrically connected to the first node Q. The pull-up module 20 may include a bootstrap capacitor Cbt, a pull-up transistor T21, and a stage-transmission transistor T22. Both of the gate of the pull-up transistor T21 and the gate of the cascade-transmission transistor T22 may be electrically connected to the first node Q. Both of the source of the pull-up transistor T21 and the source of the stage-transmission transistor T22 may load the clock signal CK. The drain of the pull-up transistor T21 may be electrically connected to the gate line to output the gate signal G(N). The drain of the stage-transmission transistor T22 may be electrically connected to the gate of a pull-up control transistor T11 of another gate driving unit 100 at the subsequent stage, to transmit the gate signal G(N) to the another gate driving unit 100 as a stage-transmission signal thereof. The bootstrap capacitor Cbt is used to, after the first node Q is pre-charged, recharge the first node Q to improve the level thereof based on a transition of the clock signal CK, thereby enlarging a turn-on degree of the pull-up transistor T21 and the stage-transmission transistor T22.

The pull-down module 50 may include a third pull-down transistor T41. A gate of the third pull-down transistor T41 is electrically connected to a (N+X)th stage gate signal G(N+X). The source of the third pull-down transistor T41 is electrically connected to the voltage line to load the voltage signal VSS. When the first node Q at the (N+X)th stage gate driving unit 100 has an active voltage and the gate signal G(N) output by the gate line includes the gate active pulse p11, the third pull-down transistor T41 is turned on to pull down the level of the first node Q at the Nth stage gate driving unit 100 through the voltage signal VSS.

The pull-down maintaining module 30 may include a first inverter module 3011 (included in the inverter module 301, for the connection between the first inverter module 3011 and an external module, one may refer to a connection between the inverter module 301 and the external module as described above), the above-mentioned first pull-down transistor T32, and the first pull-down maintaining transistor T42. Both of the gate of the first pull-down transistor T32 and the gate of the first pull-down maintaining transistor T42 are electrically connected to the output terminal K of the first inverter module 3011. Both of the source of the first pull-down transistor T32 and the source of the first pull-down maintaining transistor T42 are electrically connected to the voltage line to load the voltage signal VSS. The drain of the first pull-down transistor T32 is electrically connected to the gate line. The drain of the first pull-down maintaining transistor T42 is electrically connected to the first node Q. After the first node Q is pulled down to a low level by the pull-down module 50, the output terminal K of the first inverter module 3011 outputs an inverted voltage, that is, a high voltage, which may control the first pull-down transistor T32 and the first pull-down maintaining transistor T42 to turn on, so as to pull down the gate signal on the gate line to a low level and maintain the low level of the first node Q.

The first inverter 3011 may include a first inverting transistor T51, a second inverting transistor T52, a third inverting transistor T53, and a fourth inverting transistor T54. A source and a gate of the first inverting transistor T51 and a source of the third inverting transistor T53 load a first oscillation signal LC1. A drain of the first inverting transistor T51 is electrically connected to a gate of the third inverting transistor T53. A gate of the second inverting transistor T52 and a gate of the fourth inverting transistor T54 are electrically connected to the first node Q. A source of the second inverting transistor T52 and a source of the fourth inverting transistor T54 load the voltage signal VSS. A drain of the second inverting transistor T52 is electrically connected to the drain of the first inverting transistor T51. A drain of the fourth inverting transistor T54 and a drain of the third inverting transistor T53 are configured as the output terminal K of the first inverter module 3011.

In conjunction with the above descriptions, when the first node Q is at the low level and the first oscillation signal LC1 is at the high level, the second inverting transistor T52 and the fourth inverting transistor T54 are turned off, and the first inverting transistors T51 and the third inverting transistor T53 are turned on, so that the first pull-down maintaining transistor T42 is turned on to transmit the lower level voltage signal VSS to the first node Q to pull down the first node Q.

Further, the inverter module 301 may further include a second inverter module 3012 arranged symmetrically with the first inverter module 3011. The second inverter module 3012 may include a fifth inverting transistor T61 arranged symmetrically with the first inverting transistor T51, a sixth inverting transistor T62 arranged symmetrically with the second inverting transistor T52, a seventh inverting transistor T63 arranged symmetrically with the third inverting transistor T53, and an eighth inverting transistor T63 arranged symmetrically with the fourth inverting transistor T54. A source and a gate of the fifth inverting transistor T61 and a source of the seventh inverting transistor T63 load a second oscillation signal LC2. For the electrical connections and working principals of the transistors in the second inverter module 3012, one may be referred to relating descriptions of the first inverter module 3011.

The first oscillation signal LC1 and the second inverter module 3012 may be reverse signals to each other to control the first inverter module 3011 and the second inverter module 3012 to operate alternately, thereby improving the reliability of the inverter module 301.

Some embodiments of the present disclosure provide a display panel, which includes the gate driving circuit as described above.

The present disclosure provides a gate driving circuit and a display panel, including a plurality of cascaded gate driving units. In one of the cascaded gate driving units, based on a pull-up control module, a pull-up module electrically connected to the pull-up control module through a first node, and a pull-down maintaining module (including an inverter module) electrically connected between the first node and a voltage line and electrically connected to the control terminal of the pull-up module through the first node, a voltage control module is arranged to be electrically connected to an output terminal of the inverter module and is configured to control a first transition edge of a signal at the output terminal of the inverter module to lag behind a second transition edge of a clock signal within a duration of a corresponding clock pulse of the clock signal. The first transition edge is arranged adjacent to the second transition edge on a time axis. The second transition edge corresponds to an end of the clock pulse. In this way, a leakage path is avoided when a difference between a voltage value of the clock signal and a voltage signal of the voltage line is relatively large, thereby avoiding a large leakage current and reducing a risk of the gate driving unit being burned out.

The gate driving circuit and display panel provided by some embodiments of the present disclosure have been introduced in detail above. Specific examples are used in this article to illustrate the principles and implementation methods of the present disclosure. The description of the above embodiments is only used to help understand technical solutions and core ideas of the present disclosure. Those of ordinary skills in the art should understand that they can still modify the technical solutions recorded in the foregoing embodiments, or make equivalent substitutions for some of the technical features. However, these modifications or substitutions do not make the essence of the corresponding technical solutions depart from the scope of the present disclosure.

What is claimed is:

1. A gate driving circuit, comprising a plurality of cascaded gate driving units, wherein each gate driving unit of at least one gate driving unit of the gate driving units comprises:

a pull-up control module configured to pull up a level of a first node of the each gate driving unit in response to a stage-transmission signal;

a pull-up module, wherein a control terminal of the pull-up module is electrically connected to the pull-up control module through the first node, an input terminal of the pull-up module is electrically connected to a clock signal line to load a clock signal, an output terminal of the pull-up module is electrically connected to a gate line, and the pull-up module is configured to respond to the level of the first node to transmit the clock signal to the gate line;

a pull-down maintaining module, wherein the pull-down maintaining module is electrically connected between the first node and a voltage line and is electrically connected to the control terminal of the pull-up module through the first node, the pull-down maintaining module comprises an inverter module and a switch element, a control terminal of the inverter module is electrically connected to the first node, and an output terminal of the inverter module is electrically connected to a control terminal of the switch element, and the switch element is configured to control connection between the gate line and the voltage line; and a voltage control module, wherein the voltage control module is electrically connected to the output terminal of the inverter module, the voltage control module is configured to control a first transition edge of a signal at the output terminal of the inverter module to lag behind a second transition edge of the clock signal within a duration of a corresponding clock pulse of the clock signal, the first transition edge is arranged adjacent to the second transition edge on a time axis, and the second transition edge corresponds to an end of the clock pulse.

2. The gate driving circuit according to claim 1, wherein the voltage control module comprises:

a first voltage control terminal electrically connected to a first control line to load a first control signal;

a voltage input terminal electrically connected to a first voltage line to load a first voltage; and a voltage output terminal electrically connected to the output terminal of the inverter module;

wherein the first control signal is used to control transmission of the first voltage to the voltage output terminal before the clock signal reaches the second transition edge.

3. The gate driving circuit according to claim 2, wherein the first control line is the clock signal line.

4. The gate driving circuit of claim 2, wherein the first input terminal of the inverter module is electrically connected to the first voltage line.

5. The gate driving circuit according to claim 2, wherein the voltage control module further comprises a second voltage control terminal electrically connected to a second control line to load a second control signal, wherein the second control signal is used to control transmission of the first voltage to the voltage output terminal through the first control signal before the clock signal reaches the second transition edge.

6. The gate driving circuit according to claim 5, wherein the second control signal is used to control the inverter module to control the level of the first node after the clock signal reaches the second transition edge.

7. The gate driving circuit according to claim 5, wherein the at least one gate driving unit comprises a first gate driving unit and a second gate driving unit subsequently cascaded to the first gate driving unit, and the second control line of the first gate driving unit is electrically connected to the first node of the second gate driving unit.

8. The gate driving circuit according to claim 5, wherein the voltage control module comprises:

a first voltage control transistor, wherein a gate of the first voltage control transistor is configured as the second voltage control terminal, and a source of the first voltage control transistor is configured as the first voltage control terminal; and a second voltage control transistor, wherein a gate of the second voltage control transistor is electrically connected to a drain of the first voltage control transistor, a source of the second voltage control transistor is configured as the voltage input terminal, and a drain of the second voltage control transistor is configured as the voltage output terminal.

9. The gate driving circuit according to claim 1, wherein the switch element comprises:

a first pull-down transistor, wherein a gate of the first pull-down transistor is electrically connected to the output terminal of the inverter module, a source of the first pull-down transistor is electrically connected to the voltage line, and a drain of the first pull-down transistor is electrically connected to the gate line.

10. A display panel, comprising a gate driving circuit, wherein the gate driving circuit comprises a plurality of cascaded gate driving units, wherein each gate driving unit of at least one gate driving unit of the gate driving units comprises:

a pull-up control module configured to pull up a level of a first node of the each gate driving unit in response to a stage-transmission signal;

a pull-up module, wherein a control terminal of the pull-up module is electrically connected to the pull-up control module through the first node, an input terminal of the pull-up module is electrically connected to a clock signal line to load a clock signal, an output terminal of the pull-up module is electrically connected to a gate line, and the pull-up module is configured to respond to the level of the first node to transmit the clock signal to the gate line;

a pull-down maintaining module, wherein the pull-down maintaining module is electrically connected between the first node and a voltage line and is electrically connected to the control terminal of the pull-up module through the first node, the pull-down maintaining module comprises an inverter module and a switch element, a control terminal of the inverter module is electrically connected to the first node, and an output terminal of the inverter module is electrically connected to a control terminal of the switch element, and the switch element is configured to control connection between the gate line and the voltage line; and a voltage control module, wherein the voltage control module is electrically connected to the output terminal of the inverter module, the voltage control module is configured to control a first transition edge of a signal at the output terminal of the inverter module to lag behind a second transition edge of the clock signal within a duration of a corresponding clock pulse of the clock signal, the first transition edge is arranged adjacent to the second transition edge on a time axis, and the second transition edge corresponds to an end of the clock pulse.

11. The display panel according to claim 10, wherein the voltage control module comprises:

a first voltage control terminal electrically connected to a first control line to load a first control signal;

a voltage input terminal electrically connected to a first voltage line to load a first voltage; and a voltage output terminal electrically connected to the output terminal of the inverter module;

wherein the first control signal is used to control transmission of the first voltage to the voltage output terminal before the clock signal reaches the second transition edge.

12. The display panel according to claim 11, wherein the first control line is the clock signal line.

13. The display panel of claim 11, wherein the first input terminal of the inverter module is electrically connected to the first voltage line.

14. The display panel according to claim 11, wherein the voltage control module further comprises a second voltage control terminal electrically connected to a second control line to load a second control signal, wherein the second control signal is used to control transmission of the first voltage to the voltage output terminal through the first control signal before the clock signal reaches the second transition edge.

15. The display panel according to claim 14, wherein the second control signal is used to control the inverter module to control the level of the first node after the clock signal reaches the second transition edge.

16. The display panel according to claim 14, wherein the at least one gate driving unit comprises a first gate driving unit and a second gate driving unit subsequently cascaded to the first gate driving unit, and the second control line of the first gate driving unit is electrically connected to the first node of the second gate driving unit.

17. The display panel according to claim 14, wherein the voltage control module comprises:

a first voltage control transistor, wherein a gate of the first voltage control transistor is configured as the second voltage control terminal, and a source of the first voltage control transistor is configured as the first voltage control terminal; and a second voltage control transistor, wherein a gate of the second voltage control transistor is electrically connected to a drain of the first voltage control transistor, a source of the second voltage control transistor is configured as the voltage input terminal, and a drain of the second voltage control transistor is configured as the voltage output terminal.

18. The display panel according to claim 10, wherein the switch element comprises:

a first pull-down transistor, wherein a gate of the first pull-down transistor is electrically connected to the output terminal of the inverter module, a source of the first pull-down transistor is electrically connected to the voltage line, and a drain of the first pull-down transistor is electrically connected to the gate line.

* * * * *